United States Patent [19] | [11] Patent Number: 5,040,813
Cumbie | [45] Date of Patent: Aug. 20, 1991

[54] ACCESSORY HOLDER AND MOUNT FOR WHEELCHAIR

[76] Inventor: Carlyen F. Cumbie, 1169 Cole Dr., Lilburn, Ga. 30247

[21] Appl. No.: 556,030

[22] Filed: Jul. 20, 1990

[51] Int. Cl.[5] ........................ B62J 11/00; A47B 83/02

[52] U.S. Cl. .......................... 280/304.1; 297/DIG. 4; 297/162

[58] Field of Search .......................... 280/304.1, 250.1; 297/DIG. 4, 161, 162; 224/275, 274

[56] References Cited

U.S. PATENT DOCUMENTS

| | | | |
|---|---|---|---|
| 4,403,786 | 9/1983 | Vlics | 280/304.1 |
| 4,431,206 | 2/1984 | Pryor | 280/304.1 |
| 4,705,287 | 11/1987 | Cumbie | 280/304.1 |
| 4,840,391 | 6/1989 | Schneider | 280/304.1 |
| 4,878,685 | 1/1989 | Bahm | 297/162 X |
| 4,974,807 | 12/1990 | Moineau | 224/275 X |

*Primary Examiner*—Charles A. Marmor
*Assistant Examiner*—Kevin Hurley
*Attorney, Agent, or Firm*—James B. Middleton

[57] ABSTRACT

An accessory holder for a wheelchair is selectively mountable on a wheelchair of the type having no arm rests. The mount includes a base that fits over a lower frame member of the wheelchair. A support rod is fixed to the base and extends up, to terminate in the accessory holder. A latch is fixed to an upper frame member of the wheelchair and receives and holds the support rod. The support rod must move up to release the base from the lower frame member, and a stop on the rod prevents upward movement when the rod is held by the latch. Many different accessory holders may be carried by the support rod, and the accessory holders are interchangeable with respect to one wheelchair.

6 Claims, 2 Drawing Sheets

40
41
20A
19

42
44
45
46
20B 60
61
62
64
65
20G
48
54
51
52
49
50
20C 55
59

20D

20F

ACCESSORY HOLDER AND MOUNT FOR WHEELCHAIR

INFORMATION DISCLOSURE STATEMENT

Many people are confined to wheelchairs; and, quite a few of these people are relatively independent and have little assistance in their everyday lives. As a result, there have been numerous devices and arrangements to assist people in wheelchairs in dealing with everyday activities. These prior art arrangements frequently overlook the simple needs of having certain apparatus, or accessories, readily available at the wheelchair, so the person confined to the wheelchair must travel from one point to another to obtain various accessories, or must depend on another person to bring the desired items.

U.S. Pat. No. 4,705,287, by the present inventor, discloses one means for fixing accessories to a wheelchair, but that device requires either a post for an arm rest, or a pair of arm rests. Some wheelchairs do not have arm rests, or posts; therefore, some other arrangement is needed for such wheelchairs.

SUMMARY OF THE INVENTION

This invention relates generally to accessory holders, and is more particularly concerned with an accessory holder and means for mounting the holder on a wheelchair.

The present invention provides a base member selectively engageable with the frame of a wheelchair, and a support member extending upwardly from the base member. A latching means is fixed to the frame of the wheelchair at a point above the base member, the latching means being selectively engageable with and disengageable from the support member. The upper end of the support member carries an accessory holder.

In the preferred embodiment of the invention, the base member rests on, and partially surrounds, a lower frame member of the wheelchair. The support member comprises a rod extending upwardly from the base member. The latching means is fixed to an upper frame member of the wheelchair and selectively receives the rod of the support member. The latching means can lock the rod in place or allow the rod to be easily removed. Stop means on the rod prevents upward movement of the rod while the rod is held by the latching means. Thus, a plurality of different accessories, each including a support member and a base member, can be selectively utilized with one wheelchair.

BRIEF DESCRIPTION OF THE DRAWINGS

These and other features and advantages of the present invention will become apparent from consideration of the following specification when taken in conjunction with the accompanying drawings in which.

DETAILED DESCRIPTION OF THE EMBODIMENTS

Figure 1:
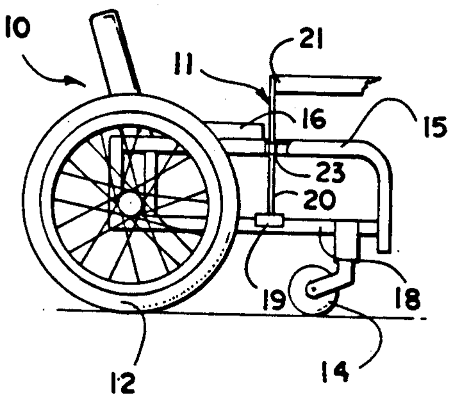
FIG. 1 is a side elevational view of a wheelchair having an accessory holder made in accordance with the present invention mounted thereon.

Referring now more particularly to the drawings, and to those embodiments of the invention here chosen by way of illustration, FIG. 1 illustrates a wheelchair generally designated at 10 having an accessory holder and mounting means generally designated at 11. The wheelchair 10 has the usual large rear wheels 12 and front casters 14. An upper, horizontal frame member 15 supports a seat 16. There is a lower horizontal frame member 18 which carries the casters 14.

The accessory holder and mounting means 11 includes a base member 19 which is readily receivable on and removable from the lower frame member 18, and also includes a support member 20 extending upwardly from the base member 19. The support member 20 carries an accessory holder 21 at its upper end. The accessory holder 21 shown in FIG. 1 is a tray holder, and is the same accessory holder disclosed in the inventor's prior U.S. Pat. No. 4,705,287. It will thus be understood that various accessory holders for use with the present mounting means may equally well be used with the prior mounting means. The support member must be modified to match one system or the other, but the accessory holders themselves can be used with either system.

In use, the device of the present invention is placed on the wheelchair with the base member 19 resting on and partially surrounding the frame member 18 while the support member 20 extends up. The latch means 23 receives the member 20 and prevents outward and upward motion. The support member 20 therefore remains in place until the latch means 21 releases the support member 20.

Figure 2:
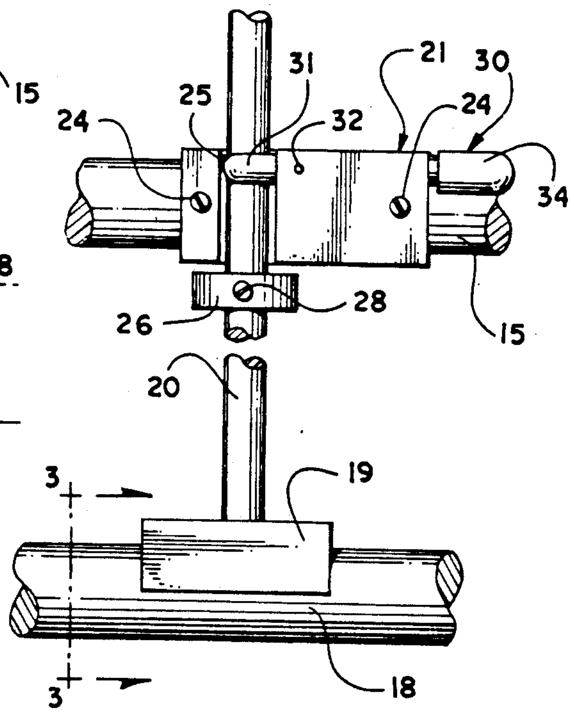
FIG. 2 is an enlarged, fragmentary view showing the mounting means disclosed in FIG. 1.
Figure 3:
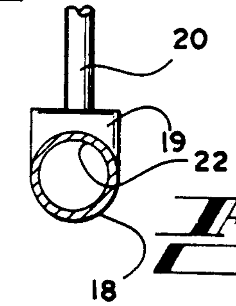
FIG. 3 is a cross-sectional view taken along the line 3—3 in FIG. 2.
Figure 4:
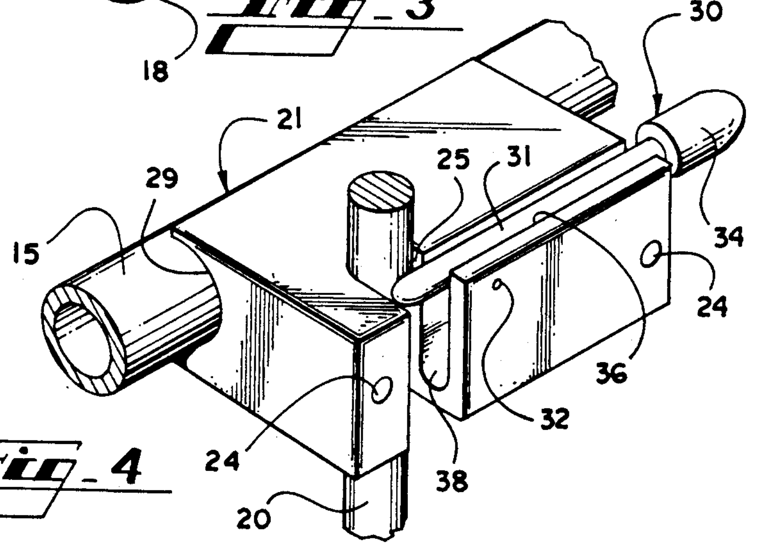
FIG. 4 is a perspective view showing the latching means in the device of FIGS. 1 and 2; and, FIGS. 5-12 are illustrations of various accessory holders in conjunction with the mounting means of the present invention.

Attention is next directed to FIGS. 2, 3 and 4 of the drawings for a full understanding of the mounting means of the present invention.

In FIGS. 2 and 3 of the drawings, it will be seen that the base member 19 is a generally rectangular piece having a concave lower surface 22. Preferably, the concave surface 22 substantially matches the convex surface of the frame member 18. The important feature, however, is that the base member 20 receives the frame member 18 therein so that the base member 19 must be raised to be released from the frame member 18.

As is best shown in FIG. 2, the latching means 23 is fixed to the frame member 15 by a pair of screws 24, and the latching means 23 defines a slot 25 for snugly receiving the support member 20. Just below the latching means 23, a collar 26 is fixed on the support member 20, and held in place by a set screw 28. The collar 26 will prevent upward movement of the support member 20; and, it will be recalled that the base member 19 cannot be released from the frame member 18 except by upward movement.

The latching means is best shown in FIGS. 2 and 4 and includes a generally rectangular body having a concave surface 29 for receiving the frame member 15. The slot 25 extends perpendicularly to the frame member 15, and the slot 25 is deep enough to receive the support member 20 therein and to allow the keeper 30 to block the slot and prevent removal of the support member from the slot.

It will be understood that many forms of keeper may be used to prevent inadvertent removal of the support member from the slot 25, but the keeper here shown is simple to construct, and is both simple and safe for the user of the wheelchair. The keeper 30 includes a pin 31 pivoted at 32, and having a head, or handle, 34. The pin extends from the pivot 32 across the slot 25 sufficiently to block the slot and prevent removal of the support member 20. The opposite end of the pin lies within a groove 36, and has enough weight that the pin 31 normally remains horizontal, simply under the influence of gravity. The location of the pivot 32 and the presence of the large head 34 assist in assuring that the pin will remain horizontal to latch the support member 20 in place.

Operation of the device will now be fully understandable. The base member 19 is placed on the lower frame member 18 and seated thereon. The latching means 23 is fixed to the upper frame member 15 of the wheelchair 10, and the support member and base member are moved until the support member is aligned with the slot 25 in the latching means 23. The handle 34 is now lifted to cause the tip of the pin 31 to pivot down and be received within the groove 38 to open the slot 25 and allow the rod of the support member 20 to be received within the slot 25. Once the support member is within the slot 25, the handle 34 is released, and the pin will assume a horizontal position as shown in FIG. 2, thereby latching the support member 20 within the slot 25. The collar 26 is so placed that the support member 20 cannot rise enough to release the base member 19 from the frame member 18. Since the collar 26 is adjustable, the tolerance is variable to suit the individual user.

If the collar is very close to the latching means 23, there may be some difficulty in seating the support member 20 in the groove 25. On the other hand, if the collar 26 is too far from the latching means 21, the support member 20 will be able to rise sufficiently to be released from the frame member 18. Thus, one will preferably keep the collar 26 set between these two extremes.

With the foregoing description in mind, it will be realized that the present invention comprises a mounting means selectively fixable to a wheelchair, and an accessory carried at the upper end of the support member of the mounting means. In the foregoing discussion, the accessory holder discussed was the tray holder 21 disclosed in U.S. Pat. No. 4,705,287; but, numerous other accessory holders can be substituted for the tray holder 21. Some of these accessory holders are shown in FIGS. 5–11 of the drawings.

In FIGS. 5–12, the base member is precisely the same as that previously described, so it always carries the same reference numeral. The support member is substantially the same as that previously described, but the accessory holder is formed integrally with the support member so there are some modifications to the support member. The support member 20 in FIGS. 5–12 therefore carries the numeral 20, but with an alphabetic suffix for each different accessory holder.

Figures 5, 6, 7, 8, 9, 11, 12:
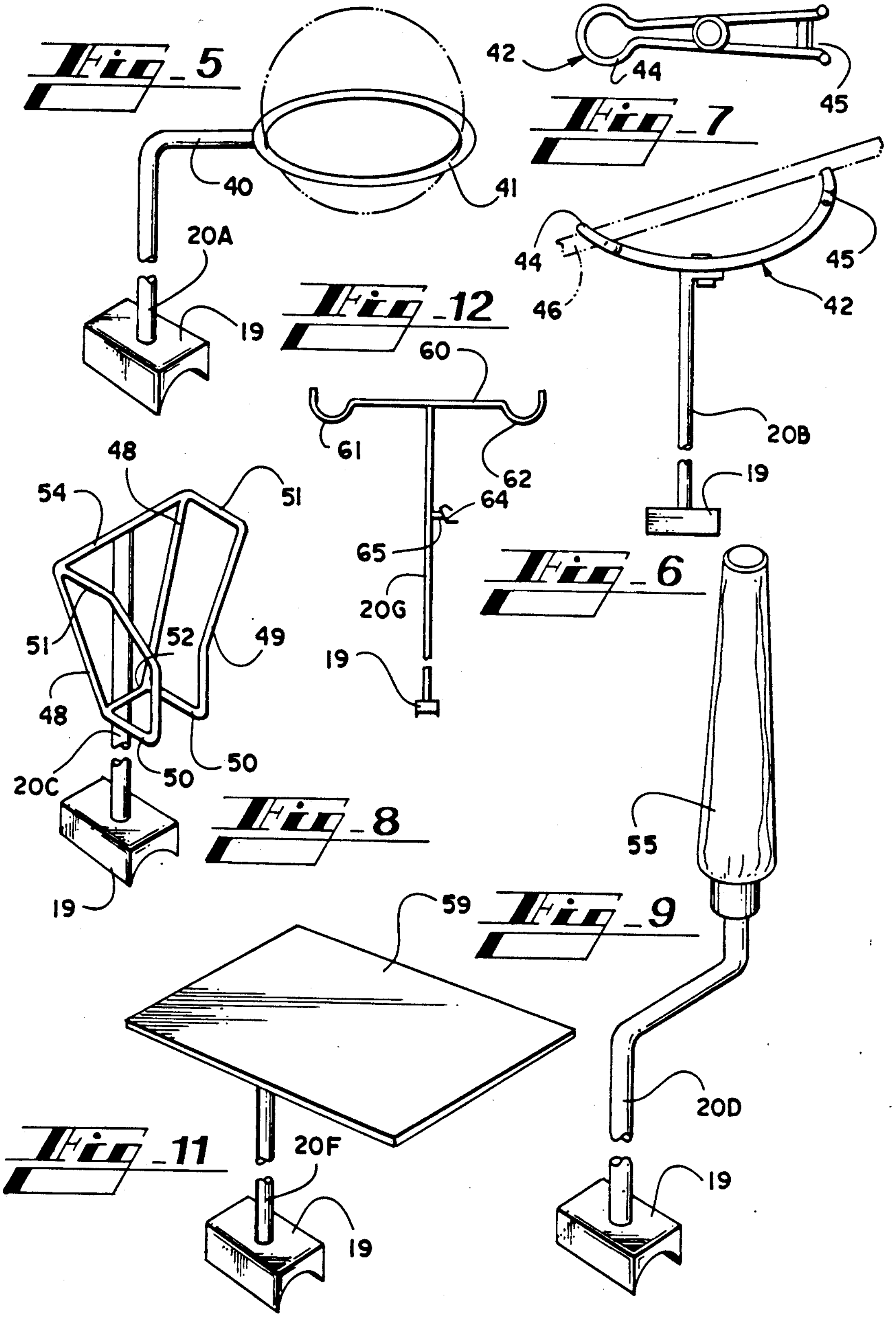

FIG. 5 of the drawings shows a bowling ball holder for a wheelchair. The base member 19 carries the support member 20A, and the upper end of the support member 20A is bent at a right angle to provide an extension 40. The extension 40 terminates in a ring 41, the ring 41 being sized so that a bowling ball will be comfortably held in the ring. The ring 41 must have a diameter smaller than the diameter of the bowling ball. Those skilled in the art can readily select the exact size based o the ball to be held.

From the orientation of the ring 41 with respect to the base member 19, it will be understood that the bowling ball will be held generally on the person's lap, to be easily accessible. Variations can be made by rotating the support member 20A with respect to the base member 19, and by moving the latching means 23 forward or rearward on the wheelchair.

The accessory holder shown in FIGS. 6 and 7 is a fishing pole holder. Again, there is a base member 19, and a support member 20B. The upper end of the support member 20B carries an arcuate holder 42 having a loop 44 and a rest 45. The loop 44 is lower than the rest 45, so a pole 46 or other elongated member can sit loosely in the rest 45 with the handle end in the loop 44. The rest 45 will act as a fulcrum while the loop 44 acts as the resistance. The pull on the outer end of the pole 46 acts as the force, so a first class lever arrangement is provided. The resistance of the loop 44 will be virtually infinite, so the pole is stably supported.

FIG. 8 discloses a holder for a telephone or the like. Preferably of course the telephone will be a cordless telephone so the person in the wheelchair is not tethered by a telephone cord.

The holder in FIG. 8 comprises rear wires 48 to provide a back for the device. The rear wires 48 are angled to have upper ends outside the confines of the telephone, and lower ends inside the confines of the telephone. Somewhat parallel front wires 49 have their lower ends at the same spacing as the rear wires 48, but the front wires 49 diverge more slowly at first, then angle out to have their upper ends at the same spacing as the rear wires 48. Side wires 50 and 51 connect the lower and upper ends of the front and rear wires 48 and 49. Horizontal wires 52 and 54 complete the device by being fixed to the rear wires 48 and the support member 20C.

The device in FIG. 9 is very simply a support member 20D with an umbrella 55 carried at the upper end thereof. Various bends can be provided to place the umbrella as preferred.

Figure 10:
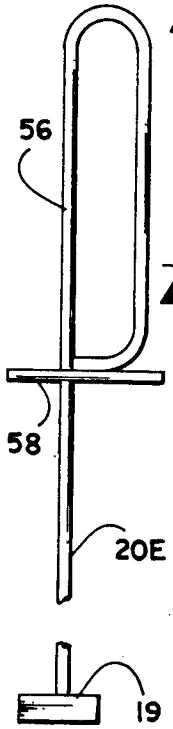

FIG. 10 depicts a thread or yarn holder. The upper end 56 of the support member 20E is doubled to yield a greater thickness to receive spools of yarn having a large hole in the center. A pin or flange 58 limits the downward movement of the yarn.

FIG. 11 shows a writing table 59. The writing table 59 is fixed to the upper end of the support member 20F, and provides a small surface to allow some writing or other such work while leaving most of the wheelchair unobstructed. If a full desk is preferred, an arrangement such as that shown in FIG. 1 should be used; but, for smaller jobs requiring less surface area, the device of FIG. 11 works well.

Finally, FIG. 12 illustrates a stand for holding fluid to be delivered intravenously. The stand includes the usual base 19, and a support member 20G. At the uppermost end of the support member 20G there is a cross-bar 60 having hooks 61 and 62 at each end of the cross-bar 60. The hooks 61 and 62 are conventional means for holding bottles or bags of intravenous (IV) fluids.

The present invention therefore provides a simple and efficient means for selectively providing an IV stand on a wheelchair, so the IV can be used continuously while a person remains generally mobile. If desired, the present arrangement can include a tray or the like. It will be notices in FIG. 12 that there is a tray holder 64 like the tray holder 21 in FIG. 1. In FIG. 12, the tray holder 64 is fixed to the support member 20G by an arm 65. Thus, if the tray support is desired, it can be very easily fixed to the support member 20G. If the tray support 64 is not desired, it is easily omitted.

It will therefore be seen that the present invention provides an excellent mounting means for various accessories to be used by a person in a wheelchair. The mounting means is simple and effective, and easily changeable, so any desired accessory can readily be mounted on the wheelchair. Also, numerous accessory holders are provided. The accessory holders are readily usable with the mounting means of the present invention, or with other mounting means. While the present invention has been illustrated on the right side of a wheelchair, it will be readily understood that the device can be mounted on the left side when desired.

It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

I claim:

1. An accessory holder and mount for a wheelchair wherein said wheelchair has a lower frame member and an upper frame member, and said mount includes a base member receivable on and at least partially surrounding said lower frame member, a support member carried by said base member and extending upwardly therefrom, said support member including a rod extending generally perpendicularly to said upper frame member, a latch means fixed to said upper frame member, said latch means defining a slot therein for selectively receiving said rod, keeper means for selectively preventing lateral motion of said rod with respect to said latch means, and means for preventing upward movement of said support member with respect to said latch means, said accessory holder being carried at the upper end of said support member.

2. An accessory holder and mount as claimed in claim 1, said latch means including a block fixed to said upper frame member, said block defining said slot therein, said keeper means including a pin pivoted to said block such that one end of said pin extends across said slot when said pin is horizontal and said pin opens said slot when said pin is generally vertical.

3. An accessory holder and mount as claimed in claim 2, wherein said block defines a groove therein, said groove extending generally perpendicularly to said slot and receiving said pin therein, said block defining a second groove generally parallel to said slot for receiving said one end of said pin when said pin is generally vertical.

4. An accessory holder and mount as claimed in claim 2, said pin having a second end, said one end of said pin being shorter than said second end so that gravity urges said second end down to cause pivoting of said pin.

5. An accessory holder and mount as claimed in claim 2, said means for preventing upward movement of said support member including stop means carried by said support member adjacent to said latch means, the arrangement being such that said stop means will engage said latch means and prevent further upward movement of said support member.

6. An accessory holder and mount as claimed in claim 2, said base member having a concave surface for receiving a convex surface of said lower frame member.

* * * * *